United States Patent [19]

Mattis et al.

[11] Patent Number: 5,749,942
[45] Date of Patent: May 12, 1998

[54] APPARATUS FOR EXTRACTING A GAS FROM A LIQUID AND DELIVERING THE GAS TO A COLLECTION STATION

[75] Inventors: John Seymour Mattis, Sunnyvale; David C. Bliven, San Jose, both of Calif.

[73] Assignee: Raychem Corporation, Menlo Park, Calif.

[21] Appl. No.: 798,283

[22] Filed: Feb. 14, 1997

[51] Int. Cl.⁶ .................. B01D 19/00; B01D 53/22
[52] U.S. Cl. .................. 95/46; 96/6; 96/13; 96/14
[58] Field of Search .................. 95/46; 96/4, 6, 96/11–14

[56] References Cited

U.S. PATENT DOCUMENTS

| | | | |
|---|---|---|---|
| 3,487,751 | 1/1970 | Meijer et al. | 96/6 X |
| 3,735,562 | 5/1973 | Mousseau, Jr. et al. | 96/6 |
| 4,058,373 | 11/1977 | Kurz et al. | 55/16 |
| 4,112,737 | 9/1978 | Morgan | 73/23 |
| 4,293,399 | 10/1981 | Belanger | 204/195 P |
| 4,444,040 | 4/1984 | Sakai | 73/19 |
| 4,453,931 | 6/1984 | Pastrone | 604/153 |
| 4,461,165 | 7/1984 | Kesson | 95/46 X |
| 4,502,320 | 3/1985 | Sakai et al. | 73/23 |
| 4,516,580 | 5/1985 | Polanyi | 95/46 X |
| 4,525,127 | 6/1985 | Welker | 417/479 |
| 4,560,324 | 12/1985 | Durieux | 417/383 |
| 4,764,344 | 8/1988 | Knab | 422/89 |
| 4,853,013 | 8/1989 | Rio et al. | 96/6 |
| 4,890,478 | 1/1990 | Claiborne et al. | 73/19 |
| 4,990,054 | 2/1991 | Janocko | 96/6 X |
| 5,051,114 | 9/1991 | Nemser et al. | 96/12 X |
| 5,053,060 | 10/1991 | Kopf-Sill et al. | 95/46 |
| 5,069,793 | 12/1991 | Kaschmekat et al. | 210/640 |
| 5,070,738 | 12/1991 | Morgan | 73/863.83 |
| 5,147,417 | 9/1992 | Nemser | 96/12 X |
| 5,258,310 | 11/1993 | Abe et al. | 436/60 |
| 5,266,206 | 11/1993 | Baker et al. | 210/640 |
| 5,273,572 | 12/1993 | Baker et al. | 95/48 |
| 5,288,304 | 2/1994 | Koros et al. | 96/13 X |
| 5,299,920 | 4/1994 | Stearns | 417/426 |
| 5,326,386 | 7/1994 | Lee et al. | 96/6 |
| 5,339,672 | 8/1994 | Spicar | 73/19.1 |
| 5,389,126 | 2/1995 | Baker et al. | 95/45 |
| 5,400,641 | 3/1995 | Slemon et al. | 73/19.01 |
| 5,425,803 | 6/1995 | van Schravendijk et al. | 96/6 X |
| 5,476,367 | 12/1995 | Zimmermann et al. | 417/307 |
| 5,591,404 | 1/1997 | Mathewson | 95/46 X |

FOREIGN PATENT DOCUMENTS

| | | | |
|---|---|---|---|
| 3844456 | 7/1989 | Germany | 96/4 |
| 56-076205 | 6/1981 | Japan | 96/6 |
| 58-219067 | 12/1983 | Japan | 96/6 |
| 03-169302 | 7/1991 | Japan | 95/46 |
| WO 95/28626 | 10/1995 | WIPO | |

OTHER PUBLICATIONS

Derwent Abstract WPI 91-312762/43 (abstract of FR 2.757.653).

Derwent Abstract WPI 93/019368/03 (abstract of DE 4.222.810).

Derwent Abstract WPI 93-304273/39 (abstract of DE 4.208.961).

Derwent Abstract WPI 95-373884/48 (abstract of WO 95/28626).

Derwent Abstract WPI 95-399659/51 (abstract of JP 07/275667).

*Primary Examiner*—Robert Spitzer
*Attorney, Agent, or Firm*—Herbert G. Burkard; Yuan Chao

[57] ABSTRACT

An apparatus (10) and a method are described for extracting gas from a liquid containing dissolved gas. The liquid is pumped from an external reservoir (40) of the liquid into a separation cell (14) by a liquid-pumping chamber (11). In separation cell (14) a permselective membrane (17) effects extraction of the dissolved gas from the liquid. A gas-pumping chamber (23) pumps the extracted gas from the permeate chamber (16) of the separation cell (14) to a collection station (27), where the extracted gas can be analyzed, separated into its individual components, or stored, as desired.

20 Claims, 4 Drawing Sheets

APPARATUS FOR EXTRACTING A GAS FROM A LIQUID AND DELIVERING THE GAS TO A COLLECTION STATION

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

A number of situations arise in which it may be desirable to analyze a liquid for its content of dissolved gas(es). To illustrate, in a power transformer the transformer oil may accumulate dissolved carbon monoxide, carbon dioxide, water vapor, hydrogen, and low molecular weight hydrocarbons such as methane, ethane, ethylene, and acetylene. The identity of an accumulated gas, its concentration, and its rate of accumulation can provide valuable diagnostic information about the transformer's health, alerting a utility company to a fault which can lead to destructive failure if unrectified.

A number of devices for monitoring transformer oil have been proposed, such as disclosed in Kurz et al., U.S. Pat. No. 4,058,373 (1977); Morgan, U.S. Pat. No. 4,112,737 (1978); Sakai et al., U.S. Pat. No. 4,444,040 (1984); Sakai et al., U.S. Pat. No. 4,502,320 (1985); Poyser et al., U.S. Pat. No. 4,654,806 (1987); Claiborne et al., U.S. Pat. No. 4,890,478 (1990); Abe et al., U.S. Pat. No. 5,258,310 (1993); Spicar, U.S. Pat. No. 5,339,672 (1994); Slemon et al., U.S. Pat. No. 5,400,641 (1995); and Muhlwitz et al., WO 95/28626 (1995). While some devices do not require the separation of the gases from the oil, generally separation is a pre-requisite to analysis.

BRIEF SUMMARY OF THE INVENTION

The present invention relates to an integrated apparatus which continuously samples a liquid from an external reservoir, extracts dissolved gas(es) from the liquid, and pumps the extracted gas(es) to an external collection station where it can be analyzed, separated into its various component gases, and/or stored for later analysis, as desired. Accordingly, there is provided an apparatus for extracting dissolved gas from a gas-containing liquid and delivering the extracted gas to a collection station, comprising:

(a) a liquid pumping chamber having a wall formed of an elastic first diaphragm;

(b) a reciprocable first actuator attached to the first diaphragm, the first actuator pressing the first diaphragm inwardly during its forward stroke and pulling the first diaphragm outwardly during its reverse stroke;

(c) a separation cell partitioned into a feed chamber and a permeate chamber by a permselective membrane which, when a gas-containing liquid having at least one gas dissolved therein is introduced into the feed chamber, permits the at least one dissolved gas to diffuse thereacross and collect in the permeate chamber as extracted gas, but is substantially impermeable to the gas-containing liquid;

(d) a first liquid conduit, for connecting the liquid pumping chamber to an external reservoir of the gas-containing liquid;

(e) a second liquid conduit, for connecting the feed chamber to the external reservoir;

(f) a liquid transfer conduit connecting the liquid pumping chamber and the feed chamber;

(g) first and second check valves controlling the flow of the gas-containing liquid through the first liquid conduit and the liquid transfer conduit, respectively; one of the first and second check valves being oriented to permit flow of the gas-containing liquid into the liquid pumping chamber and the other of the first and second check valves being oriented to permit flow of the gas-containing liquid out of the liquid pumping chamber;

(h) a gas pumping chamber having a wall formed of an elastic second diaphragm;

(i) a reciprocable second actuator attached to the second diaphragm, the second actuator pressing the second diaphragm inwardly during its forward stroke and pulling the second diaphragm outwardly during its reverse stroke;

(j) a first gas conduit, for connecting the gas pumping chamber to an external collection station for extracted gas;

(k) a second gas conduit, for connecting the permeate chamber to the external collection station;

(l) a gas transfer conduit connecting the gas pumping chamber and the permeate chamber;

(m) third and fourth check-valves controlling the flow of extracted gas through the first gas conduit and the gas transfer conduit, respectively; one of the third and fourth check valves being oriented to permit flow of extracted gas into the gas pumping chamber and the other of the third and fourth check valves being oriented to permit flow of extracted gas out of the gas pumping chamber;

(n) a lever-and-fulcrum combination wherein the lever is connected to the first and second reciprocable actuators such that rocking the lever causes a reciprocating action in the first and second actuators, with the first actuator being in its forward stroke when the second actuator is in its reverse stroke and vice-versa; and (o) drive means for rocking the lever.

In another embodiment of the invention, there is provided a method for extracting dissolved gas from a gas-containing liquid and delivering the extracted gas to a collection station, comprising the steps of:

(a) providing an external reservoir of a gas-containing liquid having at least one gas dissolved therein;

(b) providing a separation cell partitioned into a feed chamber and a permeate chamber by a permselective membrane which permits the at least one gas to diffuse thereacross but is substantially impermeable to the gas-containing liquid;

(c) circulating the gas-containing liquid between the external reservoir and the feed chamber, the circulating action being provided by a liquid pumping chamber wherein (i) an elastic first diaphragm forms a wall of the liquid pumping chamber; and (ii) a reciprocable first actuator is attached to the first diaphragm, the first actuator pressing the first diaphragm inwardly during its forward stroke and pulling the first diaphragm outwardly during its reverse stroke;

(d) permitting the at least one gas to diffuse across the permselective membrane and collect in the permeate chamber as extracted gas;

(e) circulating the extracted gas between the permeate chamber and a collection station, the pumping action being provided by a gas pumping chamber wherein
  (i) an elastic second diaphragm forms a wall of the gas pumping chamber; and
  (ii) a reciprocable second actuator is attached to the second diaphragm, the second actuator pressing the second diaphragm inwardly during its forward stroke and pulling the second diaphragm outwardly during its reverse stroke;

wherein the reciprocating action of the first and second reciprocable actuators is provided by a lever-and-fulcrum combination in which the lever is connected to the first and second reciprocable actuators such that rocking the lever causes a reciprocating action in the first and second actuators, with the first actuator being in its forward stroke when the second actuator is in its reverse stroke and vice-versa; the rocking action of the lever being provided by a drive means for rocking the lever.

BRIEF DESCRIPTION OF THE DRAWING(S)

FIG. 1 is a side cross-section view of an apparatus of this invention. FIG. 2 is a top view of the same apparatus.

FIG. 3a is a magnified side cross-section view of the separation cell of FIG. 1. FIG. 3b is a magnified top view of a brace for the permeate chamber. FIG. 3c is a partial side cross-section view of the permselective membrane and holders therefor. FIG. 3d shows a holder.

FIG. 4 is a flowsheet showing the operation of the apparatus of this invention.

Herein, reference numerals repeated from one figure to another denote the same or like elements.

DETAILED DESCRIPTION OF THE INVENTION

Figure 1:
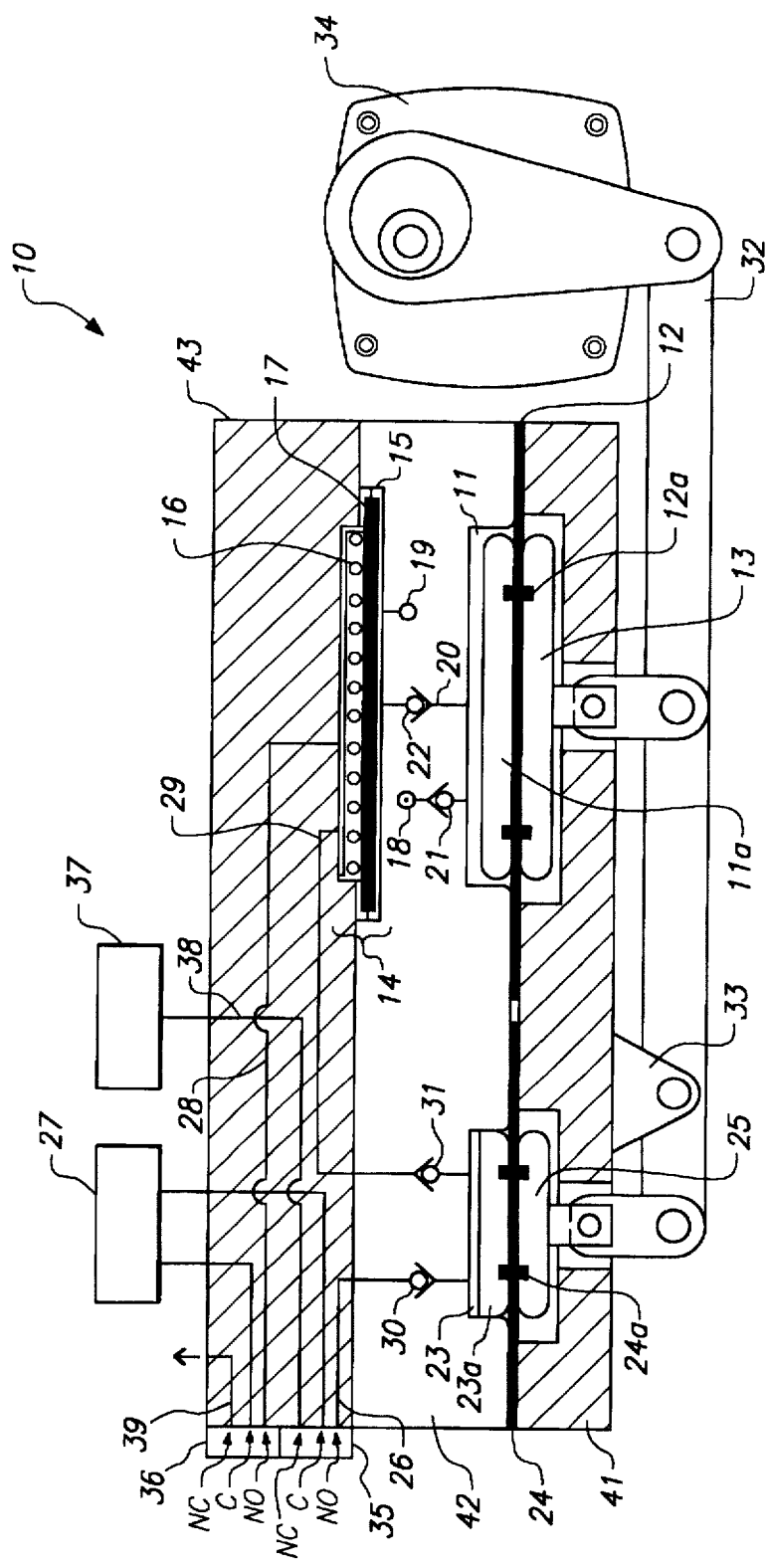

FIG. 1 shows an apparatus 10 of this invention. In this particular embodiment, apparatus 10 is fabricated from aluminum blocks 41, 42, and 43, in which openings, cavities, passageways, etc., are machined to provide the conduits, chambers, and other elements of apparatus 10. In the completed assembly, blocks 41, 42, and 43 are bolted together. Other construction materials, such as steel, brass, or plastic may also be used.

Liquid pumping chamber 11 has one of its walls defined by an elastic first diaphragm 12, made of a rubber such as silicone rubber. A first actuator 13 is attached to first diaphragm 12 via a clamp plate 11a which is bolted to actuator 13 with bolts 12a. Care is taken to seal around the holes in first diaphragm 12 through which bolts 12a pass, e.g., with gaskets. Other suitable means for attaching first actuator 13 to first diaphragm 12, such as adhesive, may also be used. First actuator 13 is capable of a reciprocal, back-and-forth motion. During its forward stroke first actuator 13 presses first diaphragm 12 inwardly relative to the cavity of pumping chamber 11. During its reverse stroke first actuator 13 pulls first diaphragm 12 outwardly, i.e., away from the cavity. Thus, a pumping action is generated in pumping chamber 11.

Apparatus 10 also includes a separation cell 14 which is partitioned into a feed chamber 15 and a permeate chamber 16 by a permselective membrane 17. Separation cell is shown in greater magnification in FIG. 3a and will be discussed in more detail with reference to FIG. 3a. When a liquid to be analyzed is introduced into feed chamber 15, membrane 17 permits any gas(es) dissolved in the liquid to diffuse across to permeate chamber 16, but retains the gas-containing liquid in feed chamber 15.

Various conduits connect pumping chamber 11 and feed chamber 15 with each other and an external reservoir 40 (not visible in FIG. 1, but see FIG. 2) of gas-containing liquid. External reservoir can be for example a transformer containing transformer oil. External reservoir 40 is connected to liquid pumping chamber 11 and feed chamber 15 by first and second liquid conduits 18 and 19, respectively. In turn, liquid pumping chamber 11 and feed chamber 15 are connected to each other by a liquid transfer conduit 20. Flow of gas-containing liquid into and out of liquid pumping chamber 11 is controlled by first and second check-valves 21 and 22, located in conduits 18 and 20, respectively. In the particular embodiment shown, first check-valve 21 is oriented so as to permit the flow of gas-containing liquid into liquid pumping chamber 11 from external reservoir 40, while second check valve 22 is oriented so as to permit the flow of gas-containing liquid out of liquid pumping chamber 11 into feed chamber 15. The reverse arrangement, in which first check-valve 21 permits flow out of liquid pumping 11 and second check-valve 22 permits inward flow is permissible. Thus, liquid pumping chamber 11, feed chamber 15, external reservoir 40, and conduits 18, 19, and 20 form a closed loop in which the gas-containing liquid is constrained by check-valves 21 and 22 to flow circularly in one direction only, driven by the pumping action of liquid pumping chamber 11.

Extracted gas in permeate chamber 16 is handled by a similar arrangement, including a gas pumping chamber 23 analogous in design to liquid pumping chamber 11. Gas pumping chamber 23 has an elastic second diaphragm 24 defining one of its walls. In this particular embodiment first and second diaphragms 12 and 24 are shown as two separate pieces of material, but may also be made of one single piece of material. A second actuator 25 is attached to second diaphragm 24 via a clamp plate 23a and bolts 24a, or other suitable means such as an adhesive. The pumping action of gas pumping chamber 23 is driven by the reciprocal movement of actuator 25, in the same manner as described for liquid pumping chamber 11.

An external collection station 27 is connected to gas pumping chamber 23 and permeate chamber 16 via first and second gas conduits 26 and 28, respectively. Gas pumping chamber 23 and permeate chamber 16 are connected to each other by gas transfer conduit 29. Flow of extracted gas in and out of gas pumping chamber 23 is controlled by a third check-valve 30 located in gas conduit 26 and a fourth check-valve 31 located in gas conduit 29. As shown, the orientation of check-valve 30 permits the flow of extracted gas out of gas pumping chamber 23 while the orientation of check-valve 31 permits the flow of extracted gas into it. Again, an arrangement with reversed orientations of check-valves 30 and 31 is permissible.

External collection station 27 can be an instrument for analyzing the extracted gas (e.g., infrared sensor, thermal conductivity detector, mass spectroscope, etc.), a separation means (e.g., gas chromatograph), or a storage cell, as suits the immediately desired disposition of the extracted gas. External collection station 27 forms, in combination with gas pumping chamber 23, permeate chamber 16, and conduits 26, 28, and 29 a closed loop circulation system for extracted gas, in which the gas is constrained to flow in one direction by check-valves 30 and 31.

First and second actuators 13 and 25 are driven by a mechanism comprising a lever 32 and a fulcrum 33. First actuator 13 is attached to lever 32 at a point thereof on one side of fulcrum 33, while second actuator 25 is attached to lever 32 at another point thereof, on the other side of fulcrum 33. The rocking of lever 32 about fulcrum 33 causes a back-and-forth movement of actuators 13 and 25, with their movement cycles 180° apart. When lever 32 is pushing actuator 23 inwards, it is pulling actuator 15 outwards, and vice-versa. The relative strokes of actuators 13 and 25 can be adjusted by adjusting the position of fulcrum 33. Towards this end, fulcrum 33 optionally may be slidably mounted on block 41. A drive means 34 rocks lever 32 and may be for example, an electric motor, a solenoid, a motor-and-spring combination, and the like.

In summary, apparatus 10 provides an integrated system in which an analyte liquid containing one or more dissolved gases is continuously sampled from an external reservoir which contains the liquid, the dissolved gases are extracted from the liquid, and then transported to a collection station for analysis, separation, storage, etc. The apparatus is simple in its design, having few moving parts and only one mechanical energy source. After sampling, the analyte liquid is returned to the reservoir, so that the reservoir is not depleted.

Some additional optional features shown in FIG. 1 are now discussed. The closed loop circulation system for the extracted gas may be equipped with three-port valves 35 (controlling conduit 26) and 36 (controlling conduit 28). Each valve has a normally open port (marked "NO"), a common port (marked "C"), and a normally closed port (marked "NC"). During normal operation as described above, the NO and C ports are connected, permitting the circulation of extracted gas from permeate chamber 16 to collection station 27 and back. If it is desired to purge or calibrate collection station 27 (e.g., where it is an infrared or thermal detector), valves 35 and 36 are switched so that the NC and C ports are connected. This allows purge gas from a purge gas source 37 to enter the system through purge gas inlet conduit 38, flush collection station 27, and vent via purge gas outlet conduit 39.

Figure 2:
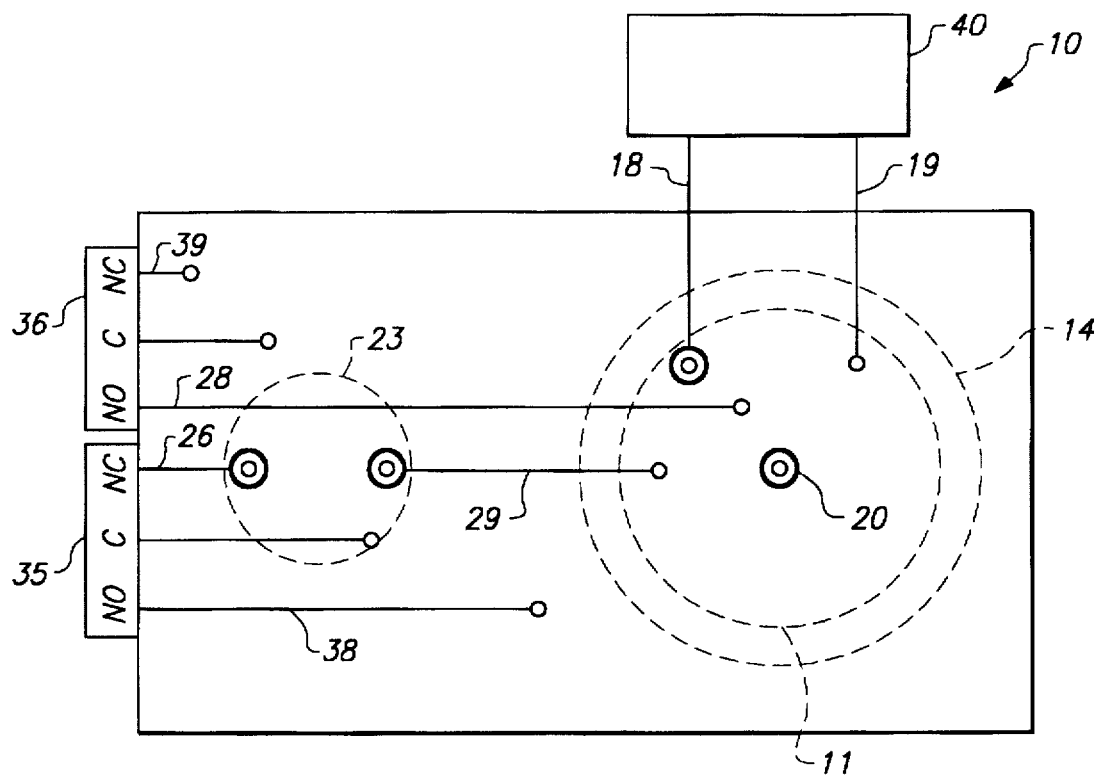

FIG. 2 is a top view of apparatus 10.

Figure 3A:
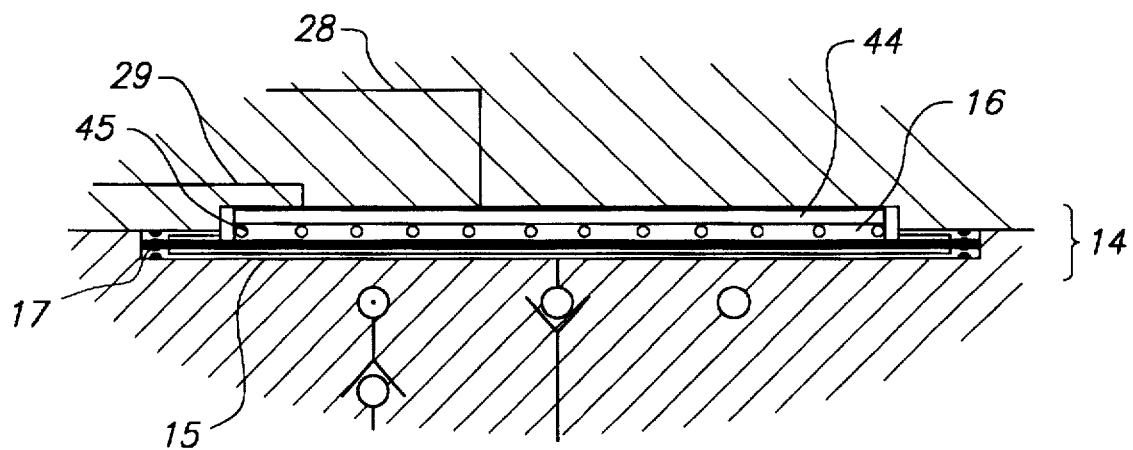
Figure 3B:
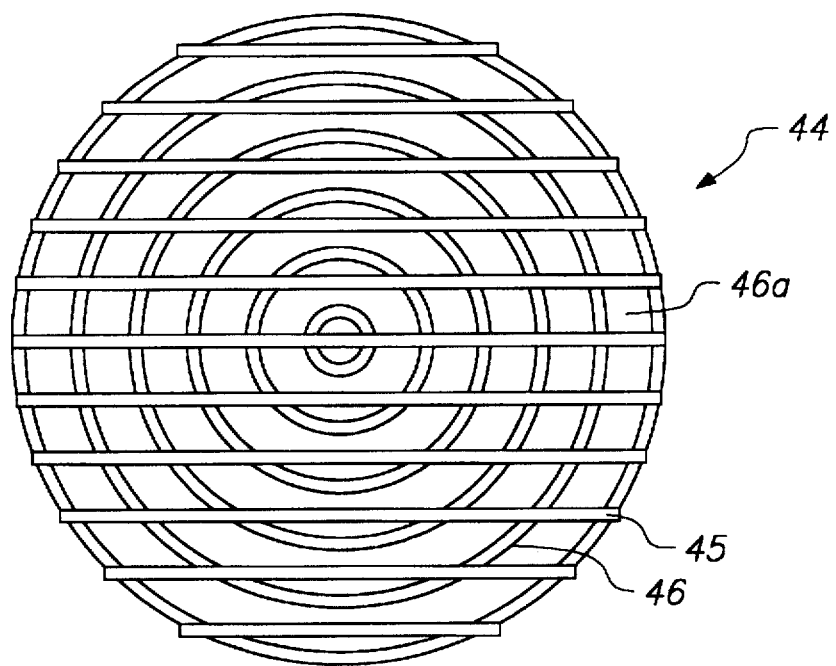

FIG. 3a is a magnified view of separation cell 14. (An even more magnified view of the permselective membrane portion of separation cell 14 is provided in FIG. 3c Noteworthy is the use of a bracing plate 44 in permeate chamber 16 to help support membrane 17 and hold it in place. Bracing plate 44 can be any structure which helps prevent membrane 17 from being distorted by a pressure differential thereacross but permits movement of the extracted gas, i.e., which does not impede the gas diffusion process or block access to conduits 28 and 29. A preferred design for bracing plate 44 is shown in more detail in FIG. 3b, in which plural linear ribs 45 are mounted on a series of concentric ribs 46 (e.g., by welding). This construction provides a plurality of openings 46a for the passage of extracted gas while providing mechanical support. Alternatively to concentric ribs 46, a spiral construction may be used.

Figure 3C:
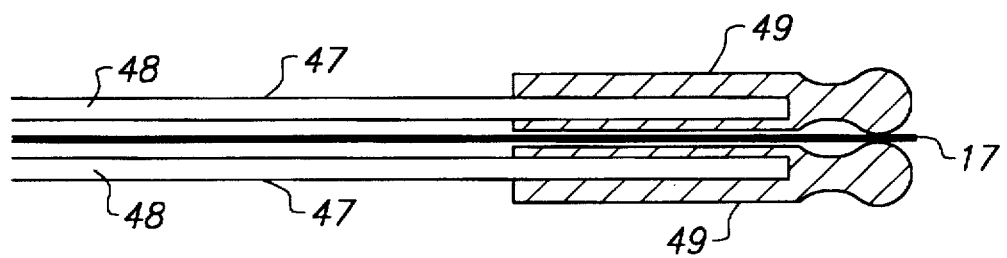
Figure 3D:
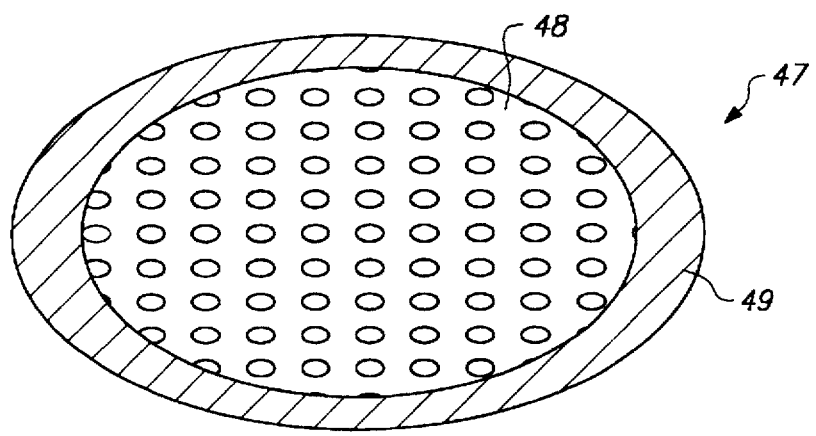

FIG. 3c shows in partial cross-section a preferred arrangement for providing relatively fragile membrane 17 with further mechanical support with minimal interference to the gas diffusion process. Membrane 17 is sandwiched between a pair of membrane holders 47, each comprising a perforated base 48 having a rubber edging 49. Base 48, which can be made for example from a perforated metal plate or a wire screen or mesh, supports membrane 17, while the edges of membrane 17 are gripped between rubber edgings 49. A different view of a membrane holder 47 is shown in FIG. 3d.

The shape shown here is circular, assuming that the membrane itself is also circular. Other shapes for the membrane (and correspondingly for membrane holders 47) are permissible. Rubber edgings 49 also press against a lip of separation cell 14, thus sealing against leakage of the gas-containing liquid from feed chamber 15 to the permeate chamber 16 around the edges of membrane 17.

Those skilled in the art will appreciate that, although in the embodiments specifically discussed hereinabove the various conduits have been depicted as bores drilled in aluminum blocks 41, 42, and 43, other constructions for the conduits, such as plastic or metal tubing or piping, are permissible.

Figure 4:
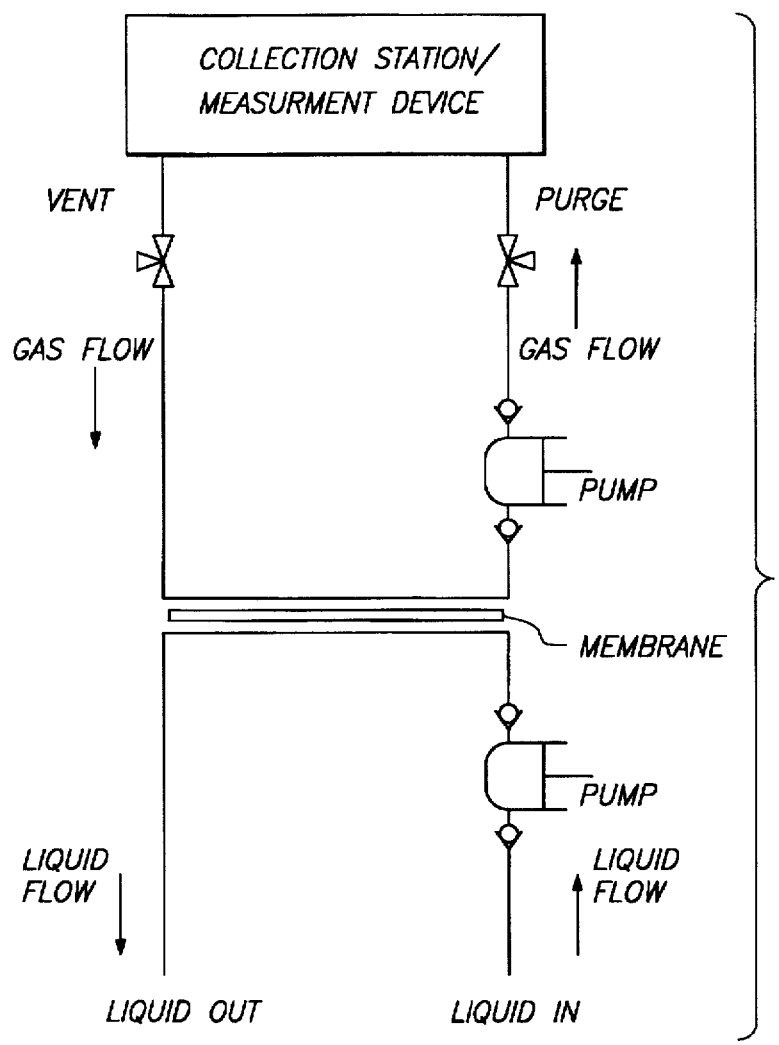

FIG. 4 is a flowsheet showing the operation of the apparatus of this invention.

The permselective membrane permits the dissolved gas (es) in the gas-containing liquid to diffuse thereacross to the permeate chamber, while being substantially impermeable to the gas-containing liquid and retaining it in the feed chamber. By "substantially impermeable," it is meant that the insufficient gas-containing liquid passes through to the permeate chamber to interfere with the functions of transporting the extracted gas, separating it into its constituent components, and/or its analysis (with or without prior separation into constituent components).

The permselective membrane preferably is made from an amorphous polymer of perfluoro-2,2-dimethyl-1,3-dioxole ("PFDD"). As used herein, the terms "PFDD polymer" and "perfluoro-2,2-dimethyl-1,3-dioxole polymer" mean the homopolymer and copolymers of perfluoro-2,2-dimethyl-1, 3-dioxole. PFDD polymers suitable for this invention are disclosed in Squire, U.S. Pat. No. 4,948,851 (1990); Squire, U.S. Pat. No. 4,975,505 (1990); Squire, U.S. Pat. No. 4,999,248 (1991); Squire, U.S. Pat. No. 5,006,382 (1991); and Nemser et al., U.S. Pat. No. 5,051,114 (1991); the disclosures of which are incorporated herein by reference. In the instance of copolymers, PFDD is copolymerized with at least one comonomer selected from the group consisting of tetrafluoroethylene, perfluoromethyl vinyl ether, vinylidene fluoride, and chlorotrifluoroethylene with PFDD constituting between 65 and 99 mole % of the copolymer. The PFDD polymer preferably has a glass transition temperature (Tg) between 140° and 240° C. PFDD polymers are available under the tradename Teflon AF from E.I. Du Pont de Nemours and Company, Wilmington, Del., in grades such as 1600 and 2400, having Tg's of 160° and 240 ° C, respectively.

Other materials, in particular other fluoropolymers such as polytetrafluoroethylene ("PTFE"), may be used for the permselective membrane, but most will not have as high a permeability and therefore are somewhat less desirable (though still within the scope of this invention).

While the membrane may be an unsupported membrane of PFDD homopolymer or copolymer, it may be desirable to minimize the thickness of the membrane to maximize the diffusion rate of the gases. Then, the membrane can beneficially be supported, for example on a porous support of, for example, vinylidene difluoride homopolymer or copolymer (collectively "PVDF polymer"), to form a composite membrane having improved ruggedness without sacrificing diffusion rates. Techniques for the preparation of suitable composite membranes are disclosed in Baker, U.S. Pat. No. 4,553,983 (1985); Blume et al., U.S. Pat. No. 4,990,255 (1991); Blume et al., U.S. Pat. No. 4,931,181 (1990); Blume et al., U.S. Pat. No. 4,963,165 (1990); Castro et al., U.S. Pat. No. 5,049,167 (1991); Bowser, U.S. Pat. No. 5,116,650

(1992); Toy et al., U.S. Pat. 5,281,255 (1994); and Blume et al., U.S. Pat. No. 5,085,775 (1992); the disclosures of each of which are incorporated herein by reference. Except for the Bowser patent, the preceding patents are all assigned to Membrane Technology and Research, Inc., of Menlo Park, California, from whom the inventors were able to obtain suitable PFDD polymer composite membranes.

More details concerning the use of PFDD membranes for the separation of one or more dissolved gases from a gas-containing liquid are provided in copending, commonly assigned application of Sunshine, Ser. No. 08/800,676, filed Feb. 14, 1997, entitled "Method for Extracting Gases Dissolved in a Liquid", the disclosure of which is incorporated herein by reference.

This invention is especially useful for separating the dissolved gas(es) which accumulate in a power transformer's oil (usually silicone or hydrocarbon oil) as the transformer ages, enabling them to be analyzed. The gases of concern are carbon monoxide, carbon dioxide, hydrogen, water vapor, methane, ethane, ethylene, and acetylene. Their identification and quantification will enable monitoring of a transformer's status, and, in the event a fault is diagnosed, preventive maintenance in advance of a catastrophic failure. The relative proportions of the extracted gases will depend on their relative proportions in transformer oil and their respective distribution (Ostwald) coefficients. From a measurement the relative amounts of extracted gases and a knowledge of their distribution coefficients (information which is either already known or readily ascertainable for most common gases), one can back-calculate the concentrations of the gases in the transformer oil. A preferred system for analyzing the gas content of transformer oils is described in the copending, commonly assigned application of Sunshine et al., Ser. No. 08/800,678, filed Feb. 14,1997, entitled "System for Measuring Gases Dissolved in a Liquid", the disclosure of which is incorporated herein by reference.

Where, as in the case of transformer monitoring, the objective is to extract a sample of the dissolved gases for analysis, a high mass transfer rate is not necessary. Then, the pumping chambers can operate at a fairly low cycle speed, such as about 4 cycles per minute. A typical pumping rate is about 0.8 to 1.2 gallons per hour for the gas-containing liquid, with the pumping rate for the extracted gas about ⅛ to 1/10 lower. An advantage of the present invention is that the relative flow rates can be readily adjusted by changing the position of fulcrum 33.

The foregoing detailed description of the invention includes passages which are chiefly or exclusively concerned with particular parts or aspects of the invention. It is to be understood that this is for clarity and convenience, that a particular feature may be relevant in more than just the passage in which it is disclosed, and that the disclosure herein includes all the appropriate combinations of information found in the different passages. Similarly, although the various figures and descriptions herein relate to specific embodiments of the invention, it is to be understood that where a specific feature is disclosed in the context of a particular figure, such feature can also be used, to the extent appropriate, in the context of another figure, in combination with another feature, or in the invention in general.

Further, while the present invention has been particularly described in terms of certain preferred embodiments, the invention is not limited to such preferred embodiments. Rather, the scope of the invention is defined by the appended claims.

What is claimed is:

1. A method for extracting dissolved gas from a gas-containing liquid and delivering the extracted gas to a collection station, comprising the steps of:
   (a) providing an external reservoir of a gas-containing liquid having at least one gas dissolved therein;
   (b) providing a separation cell partitioned into a feed chamber and a permeate chamber by a permselective membrane which permits the at least one gas to diffuse thereacross but is substantially impermeable to the gas-containing liquid;
   (c) circulating the gas-containing liquid between the external reservoir and the feed chamber, the circulating action being provided by a liquid pumping chamber wherein
      (i) an elastic first diaphragm forms a wall of the liquid pumping chamber; and
      (ii) a reciprocable first actuator is attached to the first diaphragm, the first actuator pressing the first diaphragm inwardly during its forward stroke and pulling the first diaphragm outwardly during its reverse stroke;
   (d) permitting the at least one gas to diffuse across the permselective membrane and collect in the permeate chamber as extracted gas;
   (e) circulating the extracted gas between the permeate chamber and a collection station, the pumping action being provided by a gas pumping chamber wherein
      (i) an elastic second diaphragm forms a wall of the gas pumping chamber; and
      (ii) a reciprocable second actuator is attached to the second diaphragm, the second actuator pressing the second diaphragm inwardly during its forward stroke and pulling the second diaphragm outwardly during its reverse stroke;
   wherein the reciprocating action of the first and second reciprocable actuators is provided by a lever-and-fulcrum combination in which the lever is connected to the first and second reciprocable actuators such that rocking the lever causes a reciprocating action in the first and second actuators, with the first actuator being in its forward stroke when the second actuator is in its reverse stroke and vice-versa; the rocking action of the lever being provided by a drive means for rocking the lever.

2. A method according to claim 1, wherein the external reservoir is a transformer.

3. A method according to claim 2, wherein the gas-containing liquid is a hydrocarbon oil or a silicone oil.

4. A method according to claim 2, wherein the at least one gas is selected from the group consisting of carbon monoxide, carbon dioxide, hydrogen, water vapor, methane, ethane, ethylene, and acetylene.

5. A method according to claim 2, wherein the at least one gas is a combination of at least each of carbon monoxide, carbon dioxide, hydrogen, methane, ethane, ethylene, and acetylene.

6. A method according to claim 1, wherein the permselective membrane comprises an amorphous perfluoro-2,2-dimethyl-1,3-dioxole polymer.

7. A method according to claim 6, wherein the amorphous perfluoro-2,2-dimethyl-1,3-dioxole polymer is perfluoro-2,2-dimethyl-1,3-dioxole homopolymer.

8. A method according to claim 6, wherein the amorphous perfluoro-2,2-dimethyl-1,3-dioxole polymer is a copolymer of perfluoro-2,2-dimethyl-1,3-dioxole and at least one comonomer selected from the group consisting of tetrafluoroethylene, perfluoromethyl vinyl ether, vinylidene fluoride, and chlorotrifluoroethylene; the perfluoro-2,2-dimethyl-1,3-dioxole constituting between 65 and 99 mole % of the copolymer.

9. A method according to claim 1, wherein the permselective membrane is a composite membrane in which a layer of an amorphous perfluoro-2,2-dimethyl-1,3-dioxole polymer is supported on a porous support material.

10. A method according to claim 9, wherein the support material is made of vinylidene difluoride homopolymer or copolymer.

11. A method according to claim 1, wherein the permselective membrane comprises polytetrafluoroethylene.

12. An apparatus for extracting dissolved gas from a gas-containing liquid and delivering the extracted gas to a collection station, comprising:

(a) a liquid pumping chamber having a wall formed of an elastic first diaphragm;

(b) a reciprocable first actuator attached to the first diaphragm, the first actuator pressing the first diaphragm inwardly during its forward stroke and pulling the first diaphragm outwardly during its reverse stroke;

(c) a separation cell partitioned into a feed chamber and a permeate chamber by a permselective membrane which, when a gas-containing liquid having at least one gas dissolved therein is introduced into the feed chamber, permits the at least one dissolved gas to diffuse thereacross and collect in the permeate chamber as extracted gas, but is substantially impermeable to the gas-containing liquid;

(d) a first liquid conduit, for connecting the liquid pumping chamber to an external reservoir of the gas-containing liquid;

(e) a second liquid conduit, for connecting the feed chamber to the external reservoir;

(f) a liquid transfer conduit connecting the liquid pumping chamber and the feed chamber;

(g) first and second check valves controlling the flow of the gas-containing liquid through the first liquid conduit and the liquid transfer conduit, respectively; one of the first and second check valves being oriented to permit flow of the gas-containing liquid into the liquid pumping chamber and the other of the first and second check valves being oriented to permit flow of the gas-containing liquid out of the liquid pumping chamber;

(h) a gas pumping chamber having a wall formed of an elastic second diaphragm;

(i) a reciprocable second actuator attached to the second diaphragm, the second actuator pressing the second diaphragm inwardly during its forward stroke and pulling the second diaphragm outwardly during its reverse stroke;

(j) a first gas conduit, for connecting the gas pumping chamber to an external collection station for extracted gas;

(k) a second gas conduit, for connecting the permeate chamber to the external collection station;

(l) a gas transfer conduit connecting the gas pumping chamber and the permeate chamber;

(m) third and fourth check-valves controlling the flow of extracted gas through the first gas conduit and the gas transfer conduit, respectively; one of the third and fourth check valves being oriented to permit flow of extracted gas into the gas pumping chamber and the other of the third and fourth check valves being oriented to permit flow of extracted gas out of the gas pumping chamber;

(n) a lever-and-fulcrum combination wherein the lever is connected to the first and second reciprocable actuators such that rocking the lever causes a reciprocating action in the first and second actuators, with the first actuator being in its forward stroke when the second actuator is in its reverse stroke and vice-versa; and (o) drive means for rocking the lever.

13. An apparatus according to claim 12, wherein the permselective membrane comprises an amorphous perfluoro-2,2-dimethyl-1,3-dioxole polymer.

14. An apparatus according to claim 13, wherein the amorphous perfluoro-2,2-dimethyl-1,3-dioxole polymer is perfluoro-2,2-dimethyl-1,3-dioxole homopolymer.

15. An apparatus according to claim 13, wherein the amorphous perfluoro-2,2-dimethyl-1,3-dioxole polymer is a copolymer of perfluoro-2,2-dimethyl-1,3-dioxole and at least one comonomer selected from the group consisting of tetrafluoroethylene, perfluoromethyl vinyl ether, vinylidene fluoride, and chlorotrifluoroethylene; the perfluoro-2,2-dimethyl-1,3-dioxole constituting between 65 and 99 mole % of the copolymer.

16. An apparatus according to claim 12, wherein the permselective membrane is a composite membrane in which a layer of an amorphous perfluoro-2,2-dimethyl-1,3-dioxole polymer is supported on a porous support material.

17. An apparatus according to claim 16, wherein the support material is made of vinylidene difluoride homopolymer or copolymer.

18. An apparatus according to claim 12, wherein the permselective membrane comprises polytetrafluoroethylene.

19. An apparatus according to claim 12, wherein the permselective membrane is sandwiched between a pair of membrane holders each comprising a perforated base having a rubber edging, the rubber edging gripping the edges of the permselective membrane.

20. An apparatus according to claim 12, wherein the permeate chamber contains a bracing plate which helps prevent the permselective membrane from being distorted by a pressure differential thereacross but permits movement of the extracted gas.

* * * * *